Patented Jan. 27, 1953

2,626,963

UNITED STATES PATENT OFFICE 2,626,963

PRODUCTION OF VINYL FLUORIDE

Jared Wilson Clark, Charleston, W. Va., assignor to Union Carbide and Carbon Corporation, a corporation of New York No Drawing. Application January 6, 1951, Serial No. 204,833

13 Claims. (Cl. 260—653)

This invention relates to the production of vinyl fluoride; and more especially it concerns the production of vinyl fluoride by the vapor phase reaction of acetylene with hydrogen fluoride in the presence as catalyst of a cuprous cyanide deposited upon activated carbon or other suitable porous support that is inert to the action of hydrogen fluoride.

Liquid phase processes are known for making vinyl chloride by reacting acetylene and aqueous hydrochloric acid solutions at 20° C.–40° C. in the presence as catalyst of a mixture prepared from a cuprous salt and a salt of ammonium or of a tertiary amine. Also various compounds of mercury have been used as catalysts in the reaction of acetylene and hydrogen chloride. However, such compounds have not proven satisfactory for the preparation of vinyl fluoride by the vapor phase reaction of acetylene and hydrogen fluoride. Mercuric compounds tend to decompose to free mercury which vaporizes and then condenses out in various parts of the apparatus. Loss of mercury, decrease in catalyst activity, and the formation of alloys with other metals are problems resulting from the use of compounds of mercury. Mercuric compounds tend to react with hydrogen fluoride to form mercuric fluoride. The latter is very active in promoting polymer formation, which results in a rapid reduction in catalyst activity and restricted flow of vapors through the catalyst bed.

This invention is based in important part upon my discovery that acetylene and hydrogen fluoride can be made to react in the vapor phase to provide very good yields of vinyl fluoride while minimizing further reaction of the latter with the hydrogen fluoride to produce difluoroethane. This is accomplished by passing hydrogen fluoride and acetylene, or a mixture of these reactants, in a molar ratio within the range from 1:1 to 10 or more:1, and preferably of at least 2:1, into contact with a novel catalyst mixture in a reaction zone maintained at a temperature of at least 100° C. Hydrogen fluoride: acetylene molar ratios around 0.5:1.0 can be used less efficiently.

The catalyst preferably is dried in the reaction tube or zone by heating in the presence of an inert gas such as nitrogen or in a current of hydrogen fluoride before passing the mixture of reactants through such zone. In practicing the invention, a mixture of hydrogen fluoride and acetylene preferably containing a molar excess of hydrogen fluoride is passed over the catalyst at a temperature within the range between 100° C. and around 240° C., and preferably between 140° C. and 190° C. The mixture of reactants contacts the catalyst at a flow rate within the range between 10 and 500 volumes, and preferably ranging from 150 to 300 volumes per volume of catalyst per hour, the flow rate varying directly with the reaction temperature and varying inversely with the ratio of hydrogen fluoride to acetylene in the reactant mixture. The yields of vinyl fluoride are increased and production ratios are improved as the temperature is raised above 100° C. Maximum single pass yields are obtained at temperatures in the range around 180° C. to 230° C. Conversion of acetylene to cuprene and loss of vinyl fluoride to polymers occur at higher temperatures, but can be avoided in part by using higher space velocities and higher ratios of hydrogen fluoride to acetylene. Excellent yields of vinyl fluoride are secured while minimizing reactant losses by using reaction temperatures within the range between 140° C. and 190° C. Although the reaction generally is conducted at around atmospheric pressure, lower pressures, and superatmospheric pressures as high as 100 pounds per square inch, can be used.

The vapors leaving the reaction zone are scrubbed with water to remove unreacted hydrogen fluoride, after which the effluent is metered, dried in a calcium chloride drying tower or the equivalent, and condensed in dry ice-acetone cooled traps. The unreacted acetylene can be recycled in the process. The condensate can be fractionated and the vinyl fluoride separately recovered.

The active catalyst is cuprous cyanide deposited upon a porous support such as activated carbon, charcoal, or other porous material that is inert to attack by hydrogen fluoride and acetylene under the conditions of the reaction. The cuprous cyanide is deposited from solutions thereof which may be prepared in various manners, under conditions inhibiting oxidation of the cuprous cyanide. Cuprous cyanide, while insoluble in water and in the common solvents, readily dissolves in mixtures of acetylene and hydrogen fluoride. Such mixtures also can contain an alkali metal fluoride. The resultant solution is evaporated to dryness upon a porous solid resistant to attack by the reactants, such as a porous carbon, to yield the catalyst. Alternatively, cuprous cyanide can be dissolved in an aqueous solution of an alkali metal cyanide—either in the presence or absence of acetylene—and the resultant solution then evaporated to dryness upon an activated carbon support or the equivalent. If desired, the heterogeneous catalyst can be charged to the catalyst tube while still moist and can be heated to temperatures as high as 200° C. or more in a current of nitrogen or of hydrogen fluoride prior to use. This facilitates removal of excess moisture and/or hydrogen fluoride, and minimizes oxidation of the cuprous cyanide catalyst during the drying operation.

The effectiveness of the cuprous cyanide in the vapor phase reaction of acetylene and hydrogen fluoride to yield vinyl fluoride is surprising since neither cuprous cyanide alone in pelleted form nor activated carbon alone is an effective catalyst for the reaction. Thus, when acetylene and hydrogen fluoride were passed over a pelleted cuprous cyanide catalyst at temperatures of 170° C. to 250° C., the effluent gas gave no indication of the presence of vinyl fluoride upon mass spectrographic analysis. Under like conditions an activated carbon alone was not an effective catalyst within the temperature range from 60° C. to 350° C. A cuprous chloride catalyst deposited on activated carbon possessed slight catalytic activity, providing a yield of 0.3% of vinyl fluoride when hydrogen fluoride and acetylene were passed over it at 170° C. in a 2:1 molar ratio.

Very active catalysts for the production of vinyl fluoride are mixtures of cuprous cyanide with polyethyleneamine hydrofluorides having molecular weights of 500 or less. These catalysts may be obtained by adding to the solution of the cuprous cyanide in the acetylene-hydrogen fluoride mixture, or to the alkali metal cyanide solution, small amounts around 1% to 15%, based upon the weight of cuprous cyanide, of a polyethyleneamine having a molecular weight around 500 or below, such as diethylenetriamine and triethylenetetramine, followed by evaporation of the solution to dryness on a porous solid support of the type herein described.

The following examples serve to illustrate the invention. In the examples all parts are given in terms of weight unless otherwise indicated.

*Example 1*

For making the catalyst, a stainless steel reactor having an agitator and connected with a brine cooled condenser was charged with 40 grams of cuprous cyanide and 310 grams of anhydrous hydrogen fluoride. Acetylene then was passed into the bottom of the reactor until the resulting solution was saturated with it—around 25 liters measured at 15° C. The reactor was put under low nitrogen pressure and the contents expelled onto 133 grams of activated carbon pellets in a stainless steel pan. Part of the excess hydrogen fluoride was evaporated, and the moist pellets were charged into a one inch (inside diameter) steel catalyst tube and heated to 170° C. in a stream of nitrogen to remove most of the residual hydrogen fluoride.

Dry hydrogen fluoride and acetylene were passed in a 3:1 molar ratio over this catalyst heated to 160° C., at a space velocity of 200 liters per liter of catalyst per hour. An approximately 40% conversion of acetylene to vinyl fluoride was secured.

*Example 2*

An aqueous solution containing 20 grams of cuprous cyanide, 28 grams of potassium cyanide and 200 grams of water was evaporated to dryness on 135 grams of activated carbon pellets. A steel reaction tube one inch in inside diameter was charged with 206 grams of this catalyst, which then was heated in a stream of nitrogen to a temperature of 200° C. for one hour. Then 56 grams of hydrogen fluoride were passed over the catalyst during one hour at 180° C.–200° C.

During a two-hour period 80 grams of hydrogen fluoride and 44 liters of acetylene were passed over this catalyst at approximately 160° C. and at a space velocity of about 250 liters per liter of catalyst per hour. Mass spectrographic analysis of the effluent gas indicated a yield of 44 mol per cent of vinyl fluoride, based upon the acetylene, per pass. The remainder of the effluent, after removing unreacted hydrogen fluoride, was acetylene.

*Example 3*

A mixture of 50 grams of cuprous cyanide and 173 grams of hydrogen fluoride was cooled in dry-ice and acetone, and acetylene was added until a clear solution resulted. The latter was evaporated to dryness upon 300 cc. of granular activated carbon in a copper container. The dry product was heated overnight at 70° C. to remove the hydrogen halide, and then was screened to remove finely divided material.

A steel tube one inch in inside diameter was charged with 325 cc. of this catalyst, and hydrogen fluoride and acetylene were fed to the tube in an approximately 10:1 molar ratio at temperatures ranging from 115° C. to above 180° C., and at the space velocities indicated in Table I. The effluent gas was passed through a water scrubber, wet meter, calcium chloride drying tower and to a dry ice-acetone cooled trap. The composition of the effluent gas was determined mass spectrographically. The analytical results, and the calculated yields and production ratios are given in Table I. Under the conditions used for recovering the products substantial losses of acetylene and the products occurred in the scrubbing system.

TABLE I

| Temperature °C. | Feed Rate [1] | | Effluent Gas | | | | | Vinyl Fluoride | |
|---|---|---|---|---|---|---|---|---|---|
| | | | Volume [1] | Composition, Mol Percent | | | | | |
| | $C_2H_2$ | HF | | $C_2H_2$ | $CH_2=CHF$ | $CH_3CHF_2$ | | Yield, Percent | P. R.[2] |
| 120 | 11.1 | 111 | 8.3 | 67.1 | 29.8 | 0.4 | | 22.3 | 5.1 |
| 152 | 22.1 | 221 | 17.5 | 48.5 | 49.6 | 0.3 | | 39.2 | 17.4 |
| 180 | 31.1 | 311 | 25.2 | 21.7 | 76.4 | 0.8 | | 61.9 | 39.46 |

[1] Gaseous hourly space velocity: liters per liter of catalyst per hour, measured at room temperature.
[2] Production ratio in grams per liter of catalyst per hour.

*Example 4*

Hydrogen fluoride and acetylene were fed in a 3:1 molar ratio and at a feed rate of approximately 200 liters of the reactant mixture per liter of catalyst per hour into contact with 250 cc. of the catalyst described below, contained in a one-inch diameter jacketed, electrically heated steel reaction tube. The temperature of the tube and catalyst was increased from an initial 95° C. to a maximum of 188° C. over a five hour period. Analysis of representative gas samples taken during this period showed a 15 mol per cent yield of vinyl fluoride, based upon the acetylene, at 120° C.; 30 mol per cent at 150° C.; and 60 mol per cent at 170° C. At the end of the five hour period the catalyst was very nearly free from cuprene.

The catalyst used in this run was made by passing acetylene into a suspension of 40 grams of cuprous cyanide and 10 parts of sodium fluoride in 178 grams of hydrogen fluoride at approximately −60° C. until a clear solution resulted. This solution then was evaporated upon 300 cc. of activated carbon by heating to remove most of the hydrogen fluoride, the balance thereof being removed after charging the catalyst to the reaction tube, by heating to 95° C.

*Example 5*

A catalyst was prepared by dissolving 24 grams of cuprous cyanide in 208 grams of hydrogen fluoride saturated with acetylene in the general manner described in Example 1. Six grams of sodium fluoride were dissolved in 64 grams of hydrogen fluoride, and the sodium fluoride and cuprous cyanide solutions were combined and evaporated to dryness upon 139 grams of activated carbon.

An electrically heated, jacketed steel reaction tube equipped for operation under pressure was charged with 250 cc. of the aforesaid catalyst. Hydrogen fluoride and acetylene then were fed over the catalyst in a 2:1 molar ratio at a temperature of approximately 150° C. and at a reactant mixture feed rate of approximately 180 liters per liter of catalyst per hour, varying the pressure within the catalyst chamber at selected intervals. Analysis of the effluent vapors showed that in operations under a pressure of 15 pounds per square inch the effluent vapors contained 31 mol per cent of vinyl fluoride and 69 mol per cent of unreacted acetylene; while in operations under a pressure of 30 pounds per square inch the vinyl fluoride content of the effluent gas was 34 mol per cent.

*Example 6*

Two grams of triethylenetetramine were dissolved in 281 grams of hydrogen fluoride. Twenty-three grams of cuprous cyanide then were added to this cooled mixture and 28 grams of acetylene were passed in, whereupon the contained solids dissolved. The resulting solution was evaporated to dryness on 300 cc. (134 grams) of activated carbon. A 250 cc. portion of this catalyst was charged to a one-inch (inside diameter) steel, electrically heated catalyst tube, and hydrogen fluoride and acetylene were passed over it in a 2 to 1 molar ratio, with the acetylene feed approximating 60 liters per liter of catalyst per hour. The catalyst temperature was slowly increased over a 3.5 hour period from an initial temperature of 120° C. to a final temperature of 192° C. The effluent gas was passed through a water scrubber to remove excess hydrogen fluoride and then analyzed for contained acetylene.

The results obtained indicated the following conversions:

| Sample No. | Reaction Time, Hours | Temperature, °C. | Vinyl Fluoride, Percent [1] |
|---|---|---|---|
| 1 | 1.0 | 120–127 | 16.9 |
| 2 | 0.5 | 127–137 | 26.9 |
| 3 | 0.5 | 137–154 | 41.4 |
| 4 | 0.5 | 154–168 | 61.5 |
| 5 | 0.5 | 168–181 | 65.0 |
| 6 | 0.5 | 181–192 | 70.1 |

[1] Mol per cent, based upon the acetylene.

The effluent gases from Sample No. 6 showed by spectrographic analysis:

32.8 mol per cent $C_2H_2$
66.7 mol per cent vinyl fluoride
0.5 mol per cent difluoroethane By the practice of this invention using the novel catalysts thereof, vinyl fluoride is prepared in good yields with very little tendency toward further conversion of the vinyl fluoride to produce difluoroethane. Under optimum conditions very low or negligible losses of the reactants to form cuprene and polymers have been observed.

The invention is susceptible of modification within the scope of the appended claims.

I claim:

1. Process for producing vinyl fluoride, which comprises briefly contacting a mixture containing hydrogen fluoride and acetylene at an elevated temperature above 100° C. with a cuprous cyanide deposited upon a porous solid substantially inert to attack by the reactants under the conditions of the resultant reaction.

2. Process for producing vinyl fluoride, which comprises briefly contacting a mixture containing hydrogen fluoride and acetylene at an elevated temperature above 100° C. with a solid catalyst comprising cuprous cyanide deposited upon a porous carbon, and recovering from the reaction mixture the vinyl fluoride thus produced.

3. Process for producing vinyl fluoride, which comprises passing hydrogen fluoride and acetylene in a molar ratio within the range between 1:1 and 10:1 at a space velocity of between 10 and 500 volumes per volume of catalyst per hour through a reaction zone containing a solid catalyst comprising cuprous cyanide deposited upon a porous solid that is substantially inert to attack by the reactants under the conditions of the reaction, said zone being maintained at a temperature within the range between 100° C. and around 240° C.

4. Process for producing vinyl fluoride, which comprises passing hydrogen fluoride and acetylene in a molar ratio of at least 1:1 at a space velocity of between 10 and 500 volumes of the total reactants per volume of catalyst per hour through a reaction zone maintained at a temperature within the range between 100° C. and 240° C. and containing a solid catalyst comprising cuprous cyanide deposited upon a porous carbon, and recovering from the effluent from said reaction zone the vinyl fluoride thus produced.

5. Process as defined in claim 4 wherein the catalyst also contains an alkali metal fluoride.

6. Process as defined in claim 4 wherein the catalyst also contains between 1% and 15%, based upon the cuprous cyanide, of a polyethyleneamine hydrofluoride.

7. Process for producing vinyl fluoride, which comprises passing a mixture of hydrogen fluoride and acetylene in a molar ratio within the range between 1:1 and 10:1 at a space velocity of between 10 and 500 volumes per volume of catalyst per hour through a reaction zone containing a catalyst comprising cuprous cyanide deposited upon a porous carbon support, said zone being maintained at a temperature within the range between 100° C. and around 240° C., and recovering from the effluent from the reaction zone the vinyl fluoride present therein.

8. Process for producing vinyl fluoride, which comprises passing a mixture of hydrogen fluoride and acetylene in a molar ratio within the range between 1:1 and 10:1 at a space velocity of between 10 and 500 volumes per volume of catalyst per hour through a reaction zone containing a solid catalyst comprising cuprous cyanide deposited upon a porous activated carbon, said zone being maintained at a temperature within the range between 100° C. and around 240° C., and recovering from the effluent from the reaction zone the vinyl fluoride present therein.

9. Process for producing vinyl fluoride, which comprises passing a mixture of hydrogen fluoride and acetylene in a molar ratio within the range between 1:1 and 10:1 at a space velocity of between 10 and 500 volumes per volume of catalyst per hour through a reaction zone containing a solid catalyst comprising cuprous cyanide deposited upon a porous carbon, said zone being maintained at a temperature within the range between around 140° C. and around 190° C., and recovering from the effluent from said reaction zone the vinyl fluoride present therein.

10. Process for producing vinyl fluoride, which comprises passing a mixture of hydrogen fluoride and acetylene containing a molar excess of hydrogen fluoride at a space velocity of between 10 and 500 volumes per volume of catalyst per hour into contact with a solid heterogeneous catalyst comprising a porous solid which is substantially inert to attack by the reactants under the conditions of the resultant reaction and which is impregnated with cuprous cyanide, in a reaction zone maintained at a temperature within the range between around 140° C. and around 190° C., and recovering from the effluent from the reaction zone the vinyl fluoride present therein.

11. Process for producing vinyl fluoride, which comprises passing acetylene and a molar excess of hydrogen fluoride at a space velocity of between 10 and 500 volumes of the total reactants per volume of catalyst per hour through a reaction zone maintained at a temperature within the range between 100° C. and 240° C., and containing a solid heterogeneous copper-containing catalyst, said catalyst being prepared by evaporating to dryness upon a porous carbon a cuprous cyanide complex prepared by dissolving cuprous cyanide in hydrogen fluoride in the presence of acetylene.

12. Process for producing vinyl fluoride, which comprises passing acetylene and a molar excess of hydrogen fluoride at a space velocity of between 10 and 500 volumes of the total reactants per volume of catalyst per hour through a reaction zone maintained at a temperature within the range between 100° C. and 240° C., and containing a solid heterogeneous copper-containing catalyst, said catalyst being prepared by evaporating to dryness upon a porous carbon a cuprous cyanide complex prepared by dissolving cuprous cyanide in an aqueous solution of an alkali metal cyanide.

13. Process for producing vinyl fluoride, which comprises passing acetylene and a molar excess of hydrogen fluoride at a space velocity of between 10 and 500 volumes of the total reactants per volume of catalyst per hour through a reaction zone maintained at a temperature within the range between 100° C. and 240° C., and containing a solid heterogeneous copper-containing catalyst, said catalyst being prepared by evaporating to dryness upon a porous carbon a solution of a cuprous cyanide-containing complex prepared by adding acetylene to a mixture of hydrogen fluoride, cuprous cyanide and triethylenetetramine.

JARED WILSON CLARK.

REFERENCES CITED

The following references are of record in the file of this patent:

UNITED STATES PATENTS

| Number | Name | Date |
|---|---|---|
| 1,934,324 | Perkins | Nov. 7, 1933 |
| 2,471,525 | Hillyer et al. | May 31, 1949 |